Patented May 12, 1953

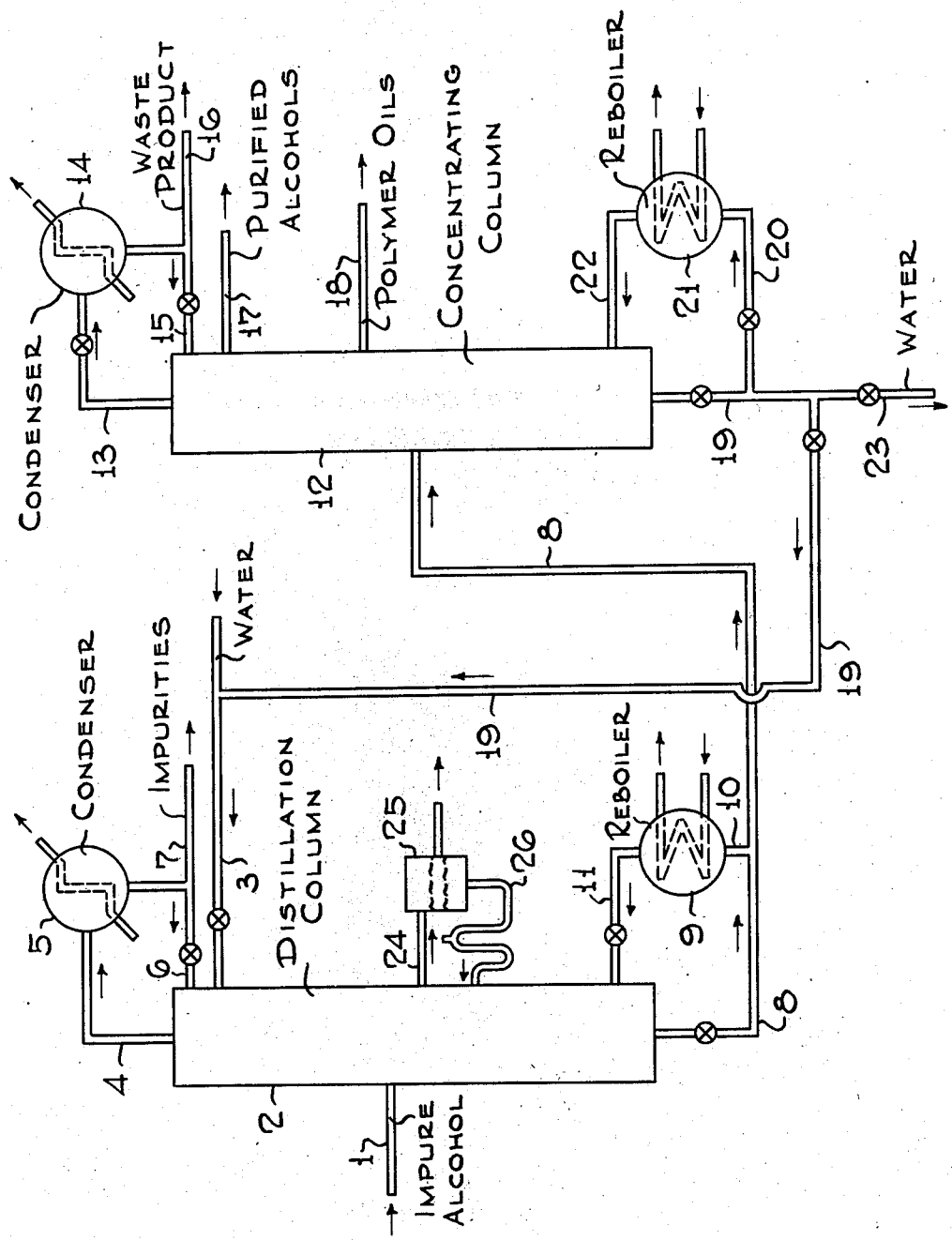

2,638,440

UNITED STATES PATENT OFFICE 2,638,440

PURIFICATION OF CRUDE ALIPHATIC ALCOHOLS

William M. Drout, Jr., Linden, Carl S. Carlson, Elizabeth, Harold W. Scheeline, West Orange, and Paul V. Smith, Jr., Westfield, N. J., assignors to Standard Oil Development Company, a corporation of Delaware Application May 1, 1948, Serial No. 24,626

10 Claims. (Cl. 202—39.5)

This invention relates to the purification of crude aliphatic alcohols produced by the reaction of mono-olefins. Specifically, the invention relates to the deodorization of crude aliphatic alcohols produced by the reaction of mono-olefins, particularly, those alcohols containing 2 to 5 carbon atoms per molecule. More particularly, the invention relates to a process whereby a malodorous alcoholic liquor of the type described, is treated to remove the malodorous impurities therefrom, such impurities including impurities boiling below the boiling point of the alcohol being purified, impurities boiling in the same range as the alcohol, and impurities boiling considerably higher than the alcohol.

It is an object of this invention to provide a process for the purification of alcohols produced by the reaction of mono-olefins, such as the hydration of olefins, the reaction of olefins with carbon monoxide and hydrogen, etc.

It is an object of this invention to provide a novel process whereby impurities, both water-soluble and water-insoluble and particularly odor-producing contaminants, are effectively removed from the above described aliphatic alcohols.

It is another object of this invention to provide a process for the production of high quality substantially odorless aliphatic alcohols, particularly those of 2 to 5 carbon atoms per molecule resulting from the catalyzed hydration of olefins.

By the catalyzed hydration of olefins is meant those processes in which mono-olefins are hydrated in the presence of a catalyst, including the well known acid catalyzed processes wherein mono-olefins are hydrated in the presence of polybasic mineral acid-acting acids such as sulfuric acid, phosphoric acid, and benzenesulfonic acid; and also those processes, sometimes called direct hydration processes, in which the olefin is hydrated in the presence of solid catalysts such as phosphoric acid, phosphoric acid-tungsten oxide, etc. or dilute aqueous acids, such as sulfuric acid or phosphoric acid etc.

By operating according to the terms of this invention high yields of highly refined alcohol of excellent odor characteristics can be produced for use in specialized industries, such as the cosmetic, perfume, drug, biological and vitamin industries. Heretofore, such alcohols were obtained only in very poor yields and at high cost by repeated refractionations of partially refined alcohols.

It is well known that alcohols produced by the sulfuric acid hydration of olefin hydrocarbons possess a distinct and apparent foreign odor, slightly penetrating and for the most part disagreeable. While no attempt will be made to definitely assign the disagreeable odor of alcohols prepared by this method to the presence of any one or combination of chemical compounds, it can be said with reasonable assurance that the odor of the crude alcohol depends to a large extent upon the quality of the starting material, viz., the olefin stream employed in the olefin hydration operation. Likewise, the odor of a refined alcohol depends to a large extent on the quality of the crude alcohol from which it is prepared.

Olefin hydrocarbons, such as those produced by the cracking of mineral oils, contain variable amounts of compounds having an obnoxious odor, particularly sulfur compounds such as hydrogen sulfide, alkyl sulfides, mercaptans, and products of sulfuric acid decomposition and reaction. These materials, present even in minute amounts in the olefin stream to the acid hydration process, are believed to contribute to the obnoxious odor of the crude alcohol. Although pure sulfur itself has no odor, it is clear that in combination with other elements it is a powerful odoriferous agent. The bad odor of alcohols has also been attributed to the presence of the so-called wide-boiling polymer products formed by side reactions during the acid catalyzed olefin hydration process. The odor of the polymer products is strengthened by the presence of any sulfur compounds dissolved therein, although the odor of some of the pure polymers themselves is by no means pleasing to the olfactory sense.

In order to show the number and diversity of the impurities present in alcohol resulting from catalyzed hydration processes, the following analysis is given for a sample of crude isopropanol produced by the sulfuric acid hydration of propylene, the proportions are based on an anhydrous alcohol basis:

| | Volume percent |
|---|---|
| Isopropanol | 90 |
| Diisopropyl ether | 5–10 |
| Acetone; hydrocarbons (B. P., 60–300° C., major portion, 100–300° C.); oxygenated compounds other than acetone incl., ethers, tertiary butyl alcohol and higher alcohols, higher ketones etc.; traces of sulfur compounds, boiling over a wide range up to | 2 |

A typical analysis of a sample of the polymer product, in this case the so-called "propyl oil" resulting from the production of isopropanol by the sulfuric acid hydration of propylene, is as follows:

55 weight percent secondary-heptanol (B. P., 137–140° C.)
21 weight percent secondary-octanol (B. P., 160–165° C.)
2 weight percent $C_7$ ketone (B. P., 131° C.)
13 weight percent hydrocarbons (B. P., above 60° up to about 300° C., chiefly polymers and copolymers of propylene)
9 weight percent ethers (B. P., above 100° C.) e. g. t-butyl isopropyl ether
Traces of sulfur compounds The composition, odor and color of the propyl oil obtained during the concentration of dilute crude isopropanol resulting from the sulfuric acid catalyzed hydration of propylene vary according to the point from which the alcohol containing it is withdrawn in the concentrating tower. Cuts have been identified ranging in color from a pale yellow to a deep red. Cuts have been identified with an odor of camphor, some of menthol odor, etc. It has also been reported that the presence of nitrogen compounds contributes to the odor of the alcohols.

In general aliphatic alcohols manufactured by the acid hydration of olefins contain, in the crude state, impurities which are peculiar to the hydration process, such as water, ethers, ketones, other alcohols, hydrocarbons, and the so-called polymer oils which are complex in nature as illustrated from the previously recited composition.

At the present time, commercial crude aqueous alcohols resulting from the acid hydration manufacturing processes are purified as far as is economically feasible in the following manner. The crude aqueous alcohol is further diluted with water to throw out of solution a portion of the water insoluble impurities, including a substantial amount of the polymer oils. The layer of impurities is removed. The remaining aqueous alcohol is then subjected to distillation in a tower called the heads column, wherein some of the low boiling impurities, particularly ethers, are removed overhead. The bottoms from the heads column is sent to a concentrating column from which various streams are removed either overhead or as side streams. For example, in the isopropanol process, a so-called "butyl cut" containing chiefly secondary butyl alcohol and water is removed at a point below the feed plate; a "propyl oil" cut is removed at a point above the feed plate; an overhead cut containing acetone is removed from the top of the tower, while the product itself, namely 91 volume percent isopropanol is removed as a side stream at a point about five plates from the top of the tower. It is not possible to obtain an economical yield of refined alcohol that will pass the water dilution test and possess an excellent odor by conventional distillation of the undiluted crude alcohol containing the polymer oil in a 70 plate column.

According to the terms of this invention the crude aqueous alcohol mixture containing the impurities above described is subjected to a distillation operation in which the crude homogeneous alcohol solution is fed to a distillation tower at a point below the top, preferably at about the mid-point of the tower, and in which water is fed to the top of the tower or at a point near the top thereof in sufficient quantity to maintain a composition of 65–99.9 mol per cent in the liquid phase in the column. The operable water concentration as determined by the water solubility of the alcohol will vary with the crude alcohol mixture being purified, e. g. ethanol 65–99 mol percent, preferably 80–99 mol percent; isopropanol 70–99 mol percent, preferably 85–99 mol percent; sec-butanol 95–99.9 mol percent; and sec-amyl alcohols 97.5–99.9%. Operation at elevated temperature and pressure greatly broadens the solubility range of secondary butanol and secondary amyl alcohol. For example, at 107° C. secondary butanol is completely miscible with water, and at 188° C. secondary amyl alcohol is completely miscible with water. Another method of enhancing the solubility of secondary butanol and sec-pentanol is the addition of low molecular weight oxygenated compounds, such as low molecular weight alcohols. In the case of sec-pentanol, acetone may be employed as a solubilizer.

The water thus supplied is sufficient to permit taking overhead all or substantially all of the impurities contained in the crude alcohol, namely, the ethers, ketones, other alcohols, light hydrocarbons some of which impurities boil as low as 30° C., and even all or a substantial portion of the high boiling polymer oils. Many of the impurities taken overhead boil normally at a temperature above the boiling point of the alcohol which is being purified, e. g. the polymer oils which boil as high as 250° C. to 300° C. Additional polymer oil impurity, particularly a portion of the higher boiling fractions thereof, concentrates in the column at a point near the alcohol feed plate upon contact of the crude alcohol feed with reflux water. This concentration of polymer oil occurs near the alcohol feed plate. A stream containing the polymer concentrate is removed from the distillation column at this point and the polymer removed therefrom by decantation. The dilute alcohol phase is returned to the column at a point about one plate below the withdrawal point. In this manner practically all the odor-producing contaminants are removed from the alcohol. The dilute aqueous alcohol product obtained as bottoms from the distillation zone and containing between 65–99 mol percent water is led to a concentrating column, wherein the desired alcohol is concentrated and recovered in high yields. The product is far superior in odor to any alcohol obtained by any of the purification methods known to the art.

If desired, the crude aqueous alcohol may be treated prior to the extractive distillation step, with additional amounts of water to throw out of solution the bulk of the polymer oil, particularly the higher boiling constituents of the polymer oil.

It has been found that 95 volume percent of the alcohol present in a crude aqueous isopropanol alcohol from the hydration of propylene having the following composition, can be recovered as high purity, excellent odor alcohol, by concentrating the weak alcohol recovered as bottoms from a 45 plate water extractive distillation column:

65 volume per cent isopropanol
1.4 volume percent propyl oil (based on alcohol content)
0.2 volume percent acetone (based on alcohol content)
5.1 volume percent isopropanol ether (based on alcohol content)
Balance—water and other impurities By operating the 45 plate extractive distillation column at a 2:1 reflux to heads ratio with the alcohol feed rate (alcohol feed to the 30th plate) and the water feed rate (water feed to the 45th plate) adjusted so that a 23.5 volume percent alcohol was drawn off at the bottom of the column, it was possible to remove the following proportions of the feed components from the alcohol in the overhead from the column:

69.7 volume percent propyl oil
100 volume percent acetone
100 volume percent isopropyl ether
5.2 volume percent isopropyl alcohol Although the overhead from the above distillation contained 5.2 volume percent of the isopropyl alcohol fed to the column, it is possible by employing optimum distillation conditions to hold the alcohol content of the overhead to a much smaller amount, say 1 volume percent or less. The weak 23.5 volume percent aqueous alcohol recovered from the extractive distillation column was concentrated in a 40 plate batch distillation column. Ten cuts of the 91 volume percent azeotrope were removed during this distillation and evaluated for odor quality as compared with commercial alcohol. It is well known that the odor of alcohol increases with the increasing optical density at certain wave lengths, for example, 2250 angstrom units.

The data presented in the following table show that 90% of the alcohol recovered is far superior to commercial alcohol, while the remaining 10% is equal to the commercial alcohol. In commercial application under continuous conditions, the first several percent of alcohol that is equal to current production would be removed as a top stream while the remaining highly purified alcohol would be removed as a side stream.

*Characteristics of 91 volume percent alcohol from extractive distillation of crude alcohol*

| Sample | Optical Density of Alcohol Compared to Distilled Water at— | | Odor as compared to Commercial Alcohol |
|---|---|---|---|
| | 2250 Å. | 2700 Å.[1] | |
| Cut #1 | 0.584 | 0.690 | Equals. |
| Cut #2 | 0.287 | 0.587 | Very much better. |
| Cut #3 | 0.261 | 0.404 | Do. |
| Cut #4 | 0.250 | 0.285 | Do. |
| Cut #5 | 0.265 | 0.205 | Do. |
| Cut #6 | 0.264 | 0.128 | Do. |
| Cut #7 | 0.300 | 0.093 | Do. |
| Cut #8 | 0.310 | 0.048 | Do. |
| Cut #9 | 0.262 | 0.034 | Do. |
| Cut #10 | 0.279 | 0.038 | Do. |
| Composite of Cuts #2 to 10 | 0.275 | 0.202 | Do. |
| Commercial Alcohol (various suppliers) | 0.4–1.0 | 0.1–0.7 | |

[1] Designation of acetone concentration. Acetone in concentrations of 0.2% or less (0.3 at 2700 Å.) does not affect the odor.

The accompanying drawing represents a flow plan in elevation of one process and accompanying apparatus for carrying out this invention.

Referring to the drawing, numeral 2 represents an extractive distillation tower, such as a 45 plate column, to which crude isopropyl alcohol or partially refined isopropyl alcohol containing 0 to 60 volume percent water is fed via line 1. The feed line is located at a point preferably above the midsection of the distillation column, for example, at about the 30th plate in a 45 plate tower. Water is fed to the tower in considerable amounts through line 3. The water is fed to the top or near the top of the tower but always above the alcohol feed plate. To obtain the desired separation of the impurities from the alcohol, the mixture is subjected to a continuous fractional distillation in column 2. The water introduced in sufficiently large quantity at the upper part of the tower effectively modifies the relative volatilities of the organic compounds being separated, and distillation of an extremely large part of the impurities from the alcohol is effected. The temperature of the water feed to the extractive distillation zone is preferably close to the temperature of the liquid on the water feed plate, although it may be lower to partially condense vapors ascending to the water feed plate. For continuous efficient operation, the water must be added continuously near the top of the column while the crude alcohol being purified is continuously fed into the column at a lower point and while sufficient heat is provided to afford distillation throughout the column. The feed stream may be preheated to a temperature close to that of the internal liquid reflux under equilibrium boiling conditions at the point of introduction. The preheated alcohol feed stream may be liquid, partially vaporized or completely vaporized when introduced into the fractionation column. Vapors of the organic compounds introduced as a feed stream pass upwardly through the distillation zone in contact with descending internal liquid reflux under equilibrium reboiling and refluxing conditions. Due to the fact that water, considerably in excess of the amount of water distilled, is introduced to mix with the condensate near the top of the distillation zone, the water concentration in the internal liquid reflux at the top of the distillation zone is higher than the water concentration in vapors passing up through the zone. In fact, excellent results have been obtained by operating the column with pure water reflux without the return of an external condensate. Contrasted therewith in normal rectification of alcohols from an aqueous feed, the water concentration diminishes rapidly toward the limiting water concentration of the aqueous azeotropes in the vapors ascending the distillation column.

The quantity of water required to be introduced continuously at the upper part of the distillation zone for accomplishing the desired separation of the impurities from the alcohol is considerably greater than the quantity of condensate with which it becomes homogeneously mixed on each plate in order to make the water concentration of the internal reflux substantially above a critical minimum in the range of 70–99.9 mol percent. With adequate water concentration in the internal reflux for effecting the separation, the alcohol to be isolated in the aqueous bottoms is dissolved in the aqueous internal reflux that reaches the bottom of the distillation column. Excellent quality isopropyl alcohol was obtained by adjusting the alcohol to water feed ratio so that 15–25 volume percent alcohol was obtained from the bottom of the distillation column.

Returning to the drawing, impurities contained in the isopropyl alcohol, namely, isopropyl ether, acetone, a substantial part of the propyl oil, water etc. are removed overhead via line 4, condensed in condenser 5 and removed from the system via line 7. Part of the condensate may be refluxed to the top of the column via line 6. Additional high boiling polymer oil has been found to concentrate as a separate phase in the column at a point near the alcohol feed plate when the feed is mixed with the aqueous reflux stream. A sidestream containing this polymer oil concentrate is removed from the column and the polymer oil is separated by continuous decantation, thus minimizing or virtually eliminating polymer oil from the concentrating column. This sidestream is removed from the column at a point below the crude alcohol feed plate, but preferably at a point immediately below the alcohol feed plate. To this end a stream can be removed from tower 2 via line 24 and sent to decanter 25. This stream is withdrawn at a point near the alcohol feed plate or slightly below the alcohol feed plate. In the decanter the stream separates into an upper polymer oil phase which is discarded, and a lower aqueous alcohol stream 26 freed of polymer oil. The latter is returned to the tower via line 26 at a point about a plate below the withdrawal point.

Bottoms from the tower 2, consisting chiefly of aqueous alcohol of about 10-40 volume per cent, preferably 15-25 volume per cent, is removed via line 8 and introduced to concentrating column 12. Part of the aqueous bottoms is withdrawn from line 8 via line 10 and sent to reboiler 9 for heating by indirect or direct heat exchange with a heating medium, such as live steam, and returned via line 11 to the distillation column. In column 12 the aqueous alcohol is concentrated to the desired level up to the 91.3 volume per cent isopropyl alcohol-water azeotrope, which is removed as a side-stream near the top of the column via line 17. The remaining propyl oil, if any, contained in the aqueous alcohol is removed from the concentrating column in a sidestream 18 at a point about three plates above the feed plate. Some remaining traces of light material, if any, and alcohol are removed overhead via line 13, condensed in condenser 14 and removed from the system via line 16. If desired, this overhead may be recycled to the extractive distillation zone. Part of the condensate may be refluxed to the top of the column via line 15. Bottoms from the concentrating column consisting substantially of water are removed via line 19 and may be recycled in whole or in part to the extractive distillation tower 2 via water supply line 3. Excess water may be removed from the system via line 23. A portion of the aqueous bottoms may be withdrawn via line 20 and sent to reboiler 21 for heating by indirect or direct heat exchange with a heating medium such as live steam and recycled to column 12 via line 22. Although the dilute aqueous alcohol solution from the distillation zone has been described as concentrated by fractional distillation, other means of concentration may be employed, such as solvent extraction.

In the separation of impurities from isopropanol produced by the acid catalyzed hydration of propylene, essentially no satisfactory separation is effected if the internal reflux contains less than 70 mol per cent water. For obtaining satisfactory results on a practical scale the preferred range is 85-99 mol per cent water in the internal reflux.

Under steady conditions in the extractive distillation zone, the internal reflux having adequate water concentration for accomplishing the separation of the wide-boiling impurities tends to have a nearly constant water concentration in a preferably homogeneous liquid phase at each plate, and the high water concentration is approximately uniform in the internal reflux below the alcohol feed plate. This internal reflux in flowing from the top to the bottom of the tower becomes richer in the alcohol while the other impurities of the feed become distilled overhead.

In the distillation process the mol per cent water in the total overhead from the extractive distillation column will vary with the operating conditions and with the nature of the impurities rejected overhead. The aqueous bottoms removed from the extractive distillation zone will contain approximately 70—99 mol per cent water. The overhead from the extractive distillation zone upon condensation and cooling frequently separates into two phases, an aqueous phase and an organic phase. An Engler distillation of a typical organic phase, resulting from the purification of isopropanol reveals that the initial boiling point lies between 40-50° C., and the final boiling point is approximately 250° C., indicating that there is considerable high boiling material contained in the overhead.

Without attempting to explain the mechanism by which the desired separation occurs in the distillation column, it can be said that the process is one of vapor-liquid extraction in which the vapors contain a greater relative concentration of the impurities than under the normal fractionation conditions in the absence of the considerable amount of water internal reflux. It is evident from the results obtained that the water employed within the limits specified, increases the effective vapor pressures of the impurities relative to the vapor pressure of the alcohol being purified, thus allowing the impurities to pass overhead from the distillation zone. Although it is preferable not to have any plates in the tower above the water feed plate, it is possible to carry out the separation with a limited number of plates above the water feed plate. However, this number should be held to a minimum.

Although the invention has been described employing pure water in the distillation process, it is permissible to use water containing a small amount of salts, such as sodium acetate, or acid, such as sulfuric acid or even caustic, such as sodium hydroxide.

Although the invention has been illustrated by the purification of isopropanol, the invention is not to be limited thereto, inasmuch as it is equally applicable to the purification of other alcohols of 2 to 5 carbon atoms per molecule resulting from olefin hydration processes, such as ethanol, tertiary butanol, secondary butanol, the secondary amyl alcohols, and tertiary amyl alcohol. In this regard the impurities are removed in a manner similar to that described for the isopropanol system. The following are approximate typical compositions of some of the crude aqueous alcohols which may be treated according to this purification process:

*Crude ethyl alcohol*

80-85 weight per cent ethyl alcohol
9-14 weight per cent ethyl ether
0.2-0.8 weight per cent hydrocarbons (B. P., 30-300° C.)
2.5-5 weight per cent colloidal carbon

*Crude secondary butyl alcohol*

75 weight per cent butyl alcohol
5 weight per cent secondary butyl ether
4 weight per cent polymer oils
Balance water and other impurities

*Crude secondary amyl alcohols*

50 volume per cent sec-amyl alcohol
20 volume per cent hydrocarbons
5-10 volume per cent sec-butyl alcohol
2-5 volume per cent tertiary amyl alcohol
5-10 volume per cent water
2-3 volume per cent ethers, e. g. sec-amyl, sec-butyl and mixed ethers
2-5 volume per cent higher alcohols, e. g. hexyl alcohols
1-2 volume per cent ketones, e. g. diethyl ketone or methyl propyl ketone As previously mentioned, the operating conditions will vary with the nature of the alcohol being purified. In this respect the amount of water added to the distillation column is important. When purifying secondary butanol, it has been found that sufficient water should be added to the distillation column to maintain a composition of 95-99.9 mol percent water in the liquid phase in the column. For secondary amyl alcohols sufficient water should be added to maintain a composition of 97.5 to 99.9 mol percent water in the liquid phase in the column.

The following data obtained from a commercial plant scale 30 plate tower illustrate the invention with respect to isopropanol purification. In these runs the crude isopropanol was fed to the 23rd plate and the water to the 29th plate.

*Table I.—Operating conditions*

| Run Number | 4 | 6 | 7 | 9 | 11 |
|---|---|---|---|---|---|
| Water Feed, G. P. H | 875 | 790 | 540 | 1,320 | 1,160 |
| Isopropanol feed, G. P. H | 469 | 518 | 564 | 1,108 | 1,125 |
| Heads removed, G. P. H | 115 | 100 | 180 | 165 | 195 |
| External Reflux, G. P. H | 50 | 0 | 0 | 0 | 0 |
| Bottoms removed, G. P. H | 1,547 | 1,460 | 1,060 | 2,380 | 2,200 |
| Temp. of Alcohol feed, °C | 79 | 79 | 79 | 78 | 73 |
| Temp. of water feed, °C | 93 | 91 | 98 | 95 | 96 |
| Temp. on 30th plate of column, °C | 92 | 93 | 87 | 93 | 92 |
| Temp. of bottoms from column, °C | 84-86 | 84-86 | 84-86 | 84-86 | 84-86 |
| Sidestream product (conch. column) G. P. H | 222 | 245 | 206 | 540 | 632 |

*Table II.—Stream analyses*

| Run Number | 4 | 6 | 7 | 9 | 11 |
|---|---|---|---|---|---|
| Crude Isopropanol Feed: | | | | | |
| Spec. Gravity 20/20 | 0.8955 | 0.8900 | 0.8925 | 0.8940 | 0.8880 |
| Vol. Percent Isopropanol | 57.3 | 61.5 | 58.7 | 57.2 | 60.1 |
| Vol. Percent Isopropyl Ether | 4.4 | 4.3 | 4.7 | 6.3 | 6.0 |
| Vol. Percent Acetone | 0.2 | 0.2 | 0.2 | 0.2 | 0.2 |
| Vol. Percent Sec Butanol | 0.3 | 0.2 | 0.3 | 0.3 | 0.3 |
| Vol. Percent Propyl Oil | 0.6 | 0.8 | 0.6 | 0.5 | 0.6 |
| Vol. Percent Water | 37.2 | 33.0 | 35.6 | 35.5 | 32.8 |
| Bottoms (Feed to Conc. Col.): | | | | | |
| Sp. Gr. 20/20 | 0.9770 | 0.9750 | 0.9690 | 0.9700 | 0.9630 |
| Vol. Percent IPE | 0.0 | 0.0 | 0.0 | 0.0 | 0.0 |
| Vol. Percent Acetone | 0.04 | 0.09 | 0.03 | 0.09 | 0.09 |
| Vol. Percent Propyl Oil | 0.02 | 0.02 | 0.02 | 0.03 | 0.04 |
| Vol. Percent IPOH | 18.8 | 19.4 | 25.3 | 24.8 | 29.1 |
| Vol. Percent Water | 81.2 | 80.5 | 74.7 | 75.1 | 70.7 |
| Sidestream Product (Conc. Column): | | | | | |
| Sp. Gr. 20/20 | 0.8170 | 0.8175 | 0.8170 | 0.8170 | 0.8180 |
| Vol. Percent IPOH | 91.55 | 91.39 | 91.63 | 91.53 | 91.22 |
| Vol. Percent Acetone | 0.08 | 0.08 | 0.00 | 0.1 | 0.1 |
| Vol. Percent Water (Diff.) | 8.37 | 8.53 | 8.37 | 8.37 | 8.68 |
| ASTM Distillation, °C | 80.2-80.4 | 80.1-80.35 | 80.1-80.25 | 80.2-80.3 | 80.1-80.4 |
| Optical Density compared to water, 2250 Å | 0.116 | 0.160 | 0.155 | 0.215 | 0.222 |
| Odor rating compared to normal production | (¹) | (¹) | (¹) | (¹) | (¹) |

¹ Superior.

What is claimed is:

1. The method of refining a $C_2$ to $C_5$ crude aliphatic mono-hydric alcohol produced by the sulfuric acid-catalyzed hydration of a single $C_2$ to $C_5$ mono-olefin, said crude alcohol containing contaminants lower boiling and higher boiling than the alcohol but substantially free of any other alcohol close-boiling thereto, said higher boiling contaminants comprising polymer oils boiling in the range of 100° C. to 300° C., which comprises continuously feeding the crude alcohol to a fractional distillation zone at an intermediate point thereof, continuously feeding water to the fractional distillation zone at a point substantially above the crude alcohol feed point to maintain an internal liquid reflux having a water content in the range of 65 to 99.9 mol percent below the point of addition of the water, distilling from said crude alcohol a vaporous mixture comprising all but traces of the lower boiling contaminants and major portion of the higher boiling contaminants wherein the distilled vaporous mixture flows countercurrent to the aqueous reflux, at temperatures above the boiling point of the alcohol, continuously withdrawing a dilute aqueous solution of the alcohol containing traces of lower boiling contaminants and the remainder of the higher boiling contaminants from a lower portion of said fractional distillation zone, rectifying the withdrawn aqueous solution of aliphatic alcohol in a second fractional distillation zone, removing from the said second fractional distillation zone an overhead product comprising the traces of lower boiling contaminants, a top side stream consisting of refined aliphatic alcohol and a lower side stream containing the remainder of the higher boiling contaminants.

2. The method of refining crude isopropyl alcohol produced by the sulfuric acid catalyzed hydration of propylene substantially free of other olefins, said crude alcohol containing contaminants lower boiling and higher boiling than the isopropyl alcohol but substantially free of other alcohols close-boiling thereto, said higher boiling contaminants comprising polymer oils boiling in the range of 100° C. to 300° C. which comprises continuously feeding the crude alcohol to a fractional distillation zone at an intermediate point thereof, continuously adding sufficient water to the fractional distillation zone at a point substantially above the crude alcohol feed point to maintain an internal liquid reflux having a water content in the range of 70 to 95 mol percent water below the point of addition of the water, distilling from said crude alcohol a vaporous mixture comprising all but traces of the lower boiling contaminants and major portion of the higher boiling contaminants wherein the distilled vaporous mixture flows countercurrent to aqueous reflux at temperatures of about 87° C. to 98° C., continuously withdrawing a dilute aqueous solution of the alcohol containing traces of lower boiling contaminants and the remainder of the higher boiling contaminants from a lower portion of said fractional distillation zone, rectifying the withdrawn aqueous solution of isopropyl alcohol in a second fractional distillation zone, removing from the said second fractional distillation zone an overhead product comprising the traces of lower boiling contaminants, a top side stream consisting of refined isopropyl alcohol and a lower side stream containing the remainder of the higher boiling contaminants.

3. The method of refining crude isopropyl alcohol produced by the sulfuric acid catalyzed hydration of propylene substantially free of other olefins, said crude alcohol containing contaminants lower boiling and higher boiling than the isopropyl alcohol but substantially free of other alcohols close-boiling thereto, said higher boiling contaminants comprising polymer oils, boiling in the range of 100° C. to 300° C. which comprises continuously feeding the crude alcohol to a fractional distillation zone at an intermediate point thereof, continuously adding sufficient water to the fractional distillation zone at a point substantially above the crude alcohol feed point to maintain an internal liquid reflux having a water content in the range of 80 to 95 mol percent water below the point of addition of the water, distilling from said crude alcohol a vaporous mixture comprising all but traces of the lower boiling contaminants and the major portion of the higher boiling contaminants wherein the distilled vaporous mixture flows countercurrent to aqueous reflux at temperatures of about 87° C. to 98° C., removing from the distillation zone at a point below the crude alcohol feed point a portion of said polymer oil contaminants having low water miscibility which are rendered immiscible by contact of the crude alcohol with the aqueous reflux, continuously withdrawing a dilute alcohol solution containing traces of lower boiling contaminants and the remainder of the higher boiling contaminants from a lower portion of said fractional distillation zone, rectifying the withdrawn aqueous solution of alcohol in a second fractional distillation zone, removing from the second fractional distillation zone an overhead product comprising the traces of lower boiling contaminants, a top side stream consisting of refined isopropyl alcohol and a lower side stream comprising the remainder of the higher boiling contaminants.

4. The method of refining crude ethyl alcohol produced by the reaction of ethylene substantially free of other olefins, said crude alcohol containing contaminants lower boiling and higher boiling than ethyl alcohol substantially free of other alcohols close-boiling thereto, said higher boiling contaminants comprising polymer oils boiling in the range of 100° C. to 300° C., which comprises continuously feeding the crude alcohol to a fractional distillation zone at an intermediate point thereof, continuously adding sufficient water to the fractional distillation zone at a point substantially above the crude alcohol feed point to maintain an internal liquid reflux having a water content in the range of 65 to 99 mol percent water below the point of addition of the water, distilling from said crude alcohol a vaporous mixture comprising all but traces of the lower boiling contaminants and major portion of the higher boiling contaminants wherein the distilled vaporous mixture flows countercurrent to aqueous reflux at temperatures above the boiling point of the aqueous ethyl alcohol, continuously withdrawing a dilute aqueous solution of the alcohol containing traces of lower boiling contaminants and the remainder of the higher boiling contaminants from a lower portion of said fractional distillation zone, rectifying the withdrawn aqueous solution of ethyl alcohol in a second fractional distillation zone, removing from the said second fractional distillation zone an overhead product comprising the traces of lower boiling contaminants, a top side stream consisting of refined ethyl alcohol and a lower side stream containing the remainder of the higher boiling contaminants.

5. The method of refining crude ethyl alcohol produced by the reaction of ethylene substantially free of other olefins, said crude alcohol containing contaminants lower boiling and higher boiling than ethyl alcohol but substantially free of other alcohols close-boiling thereto, said higher boiling contaminants comprising polymer oils which boil in the range of 100° C. to 300° C., which comprises continuously feeding the crude alcohol to a fractional distillation zone at an intermediate point thereof, continuously adding sufficient water to the fractional distillation zone at a point substantially above the crude alcohol feed point to maintain an internal liquid reflux having a water content in the range of 65 to 99 mol percent water below the point of addition of the water, distilling from said crude alcohol a vaporous mixture comprising all but traces of the lower boiling contaminants and the major portion of the higher boiling contaminants wherein the distilled vaporous mixture flows countercurrent to aqueous reflux at temperatures above the boiling point of the aqueous ethyl alcohol, removing from the distillation zone at a point below the crude alcohol feed point a portion of said polymer oil contaminants having low water miscibility which are rendered immiscible by contact of the crude alcohol with the aqueous reflux, continuously withdrawing a dilute alcohol solution containing traces of lower boiling contaminants and the remainder of the higher boiling contaminants from a lower portion of said fractional distillation zone, rectifying the withdrawn aqueous solution of alcohol in a second fractional distillation zone, removing from the second fractional distillation zone an overhead product comprising the traces of lower boiling contaminants, a top side stream consisting of refined ethyl alcohol and a lower side stream comprising the remainder of the higher boiling contaminants.

6. The method according to claim 4 in which the crude ethyl alcohol is produced by the sulfuric acid catalyzed hydration of ethylene.

7. The method according to claim 4 in which the crude ethyl alcohol is prepared by the catalyzed direct hydration of ethylene.

8. The method of refining crude secondary butyl alcohol produced by the sulfuric acid catalyzed hydration of normal butenes substantially free of other olefins, said crude alcohol containing contaminants lower boiling and higher boiling than secondary butyl alcohol but substantially free of other alcohols close-boiling thereto, said higher boiling contaminants comprising polymer oils which boil in the range of 100° C. to 300° C., which comprises continuously feeding the crude alcohol to a fractional distillation zone at an intermediate point thereof, continuously adding sufficient water to the fractional distillation zone at a point substantially above the crude alcohol feed point to maintain an internal liquid reflux having a water content in the range of 95 to 99.9 mol percent water below the point of addition of the water, distilling from said crude alcohol a vaporous mixture comprising all but traces of the lower boiling contaminants and major portion of the higher boiling contaminants wherein the distilled vaporous mixture flows countercurrent to aqueous reflux at above the aqueous boiling point of the alcohol, continuously withdrawing a dilute aqueous solution of the alcohol containing traces of lower boiling contaminants and the remainder of the higher boiling contaminants from a lower portion of said fractional distillation zone, rectifying the withdrawn aqueous solution of secondary butyl alcohol in a second fractional distillation zone, removing from the said second fractional distillation zone an overhead product comprising the traces of lower boiling contaminants, a top side stream consisting of refined secondary butyl alcohol and a lower side stream containing the remainder of the higher boiling contaminants.

9. The method of refining crude secondary butyl alcohol produced by the sulfuric acid catalyzed hydration of normal butenes substantially free of other olefins, said crude alcohol containing contaminants lower boiling and higher boiling than secondary butyl alcohol but substantially free of other alcohols close-boiling thereto, said higher boiling contaminants comprising polymer oils which boil in the range of 100° C. to 300° C., which comprises continuously feeding the crude alcohol to a fractional distillation zone at an intermediate point thereof, continuously adding sufficient water to the fractional distillation zone at a point substantially above the crude alcohol feed point to maintain an internal liquid reflux having a water content in the range of 95 to 99.9 mol percent water below the point of addition of the water, distilling from said crude alcohol a vaporous mixture comprising all but traces of the lower boiling contaminants and the major portion of the higher boiling contaminants wherein the distilled vaporous mixture flows countercurrent to aqueous reflux at above the aqueous boiling point of the alcohol, removing from the distillation zone at a point below the crude alcohol feed point a portion of said polymer oil contaminants having lower water miscibility which are rendered immiscible by contact of the crude alcohol with the aqueous reflux, continuously withdrawing a dilute alcohol solution containing traces of lower boiling contaminants and the remainder of the higher boiling contaminants from a lower portion of said fractional distillation zone, rectifying the withdrawn aqueous solution of alcohol in a second fractional distillation zone, removing from the second fractional distillation zone an overhead product comprising the traces of lower boiling contaminants, a top side stream consisting of refined secondary butyl alcohol and a lower side stream comprising the remainder of the higher boiling contaminants.

10. The method of refining a $C_2$ to $C_5$ crude aliphatic monohydric alcohol produced by hydration of a single $C_2$ to $C_5$ monoolefin, said crude alcohol containing contaminants lower-boiling and higher-boiling than the alcohol but substantially free of other alcohols close-boiling thereto, said higher-boiling contaminants comprising polymer oils boiling in the range of 100° to 300° C., which comprises continuously feeding the crude alcohol to a fractional distillation zone at an intermediate point thereof, continuously feeding water to the fractional distillation zone at a point substantially above the crude alcohol feed point to maintain an internal liquid aqueous reflux having a water content in the range of 65 to 99.9 mol percent below the point of addition of the water, distilling from said crude alcohol a vaporous mixture comprising all but traces of the lower-boiling contaminants and a major portion of the higher-boiling contaminants wherein the distilled vaporous mixture flows countercurrent to the internal liquid aqueous reflux at temperatures above the boiling point of the alcohol, continuously withdrawing a dilute aqueous solution of the alcohol containing traces of low-boiling contaminants and remaining higher-boiling contaminants from a lower portion of said fractional distillation zone, and rectifying the withdrawn aqueous solution of the aliphatic alcohol in a second fractional distillation zone to remove an overhead product comprising traces of lower-boiling contaminants and to recover a distillate of the refined aliphatic alcohol rectified and separated from said dilute aqueous solution containing said remaining higher-boiling contaminants.

WILLIAM M. DROUT, Jr.
CARL S. CARLSON.
HAROLD W. SCHEELINE.
PAUL V. SMITH, Jr.

References Cited in the file of this patent

UNITED STATES PATENTS

| Number | Name | Date |
|---|---|---|
| 887,793 | Guillaume | May 19, 1908 |
| 996,328 | Guillaume | June 27, 1911 |
| 1,929,901 | Ricard et al. | Oct. 10, 1933 |
| 2,080,111 | Bump | May 11, 1937 |
| 2,148,846 | Von Retze et al. | Feb. 28, 1939 |
| 2,290,442 | Metzl | July 21, 1942 |
| 2,290,636 | Deanesly | July 21, 1942 |
| 2,411,808 | Rupp et al. | Nov. 26, 1946 |
| 2,551,593 | Gilliland et al. | May 8, 1951 |

FOREIGN PATENTS

| Number | Country | Date |
|---|---|---|
| 598,436 | Great Britain | Feb. 17, 1948 |

OTHER REFERENCES

Robinson: Elements of Fractional Distillation, second edition, published 1930 by McGraw-Hill Book Co. Inc., New York, New York. Copy in Div. 25, pages 164–169.